Patented Feb. 13, 1940

2,189,798

UNITED STATES PATENT OFFICE 2,189,798

TREATMENT OF WELLS

Carroll Irons, Midland, Mich., assignor to The Dow Chemical Company, Midland, Mich., a corporation of Michigan No Drawing. Application December 30, 1936, Serial No. 118,272

2 Claims. (Cl. 166—21)

The invention relates to the acid treatment of wells yielding oil from a calcareous formation. It more particularly concerns an improved method of treatment wherein an aqueous acid solution is injected into the formation to increase its permeability to the flow of fluids, whereby the production of the well may be increased.

In the conventional method of acid-treating an oil well there is introduced into the well and thence into the producing formation a substantial volume of aqueous hydrochloric acid solution, pressure being applied to the acid, if necessary, to cause it to enter the formation.

I have found, in applying the foregoing method, that certain wells do not readily respond to such treatment. The rate of oil production, instead of being increased, may be, and often is, substantially reduced. I have observed also, in attempting to inject the acid solution into the formation in many such wells, that an unexpectedly high resistance is developed, preventing or restraining the flow of the acid into the formation, so that a relatively high pressure must be applied to the acid to force it out of the well into the formation. Experiment has now proved that the cause of these difficulties is that the acid solution employed, on being injected into the formation, acts on the oil therein to a certain extent, causing precipitation of a heavy sludge which forms a viscous mixture with the acid and the oil in the formation, and that such mixture, besides having a low degree of fluidity, is relatively inactive for attacking the acid-soluble portions of the formation.

I have now discovered that the foregoing difficulties may be avoided by introducing the acid into the earth formation in the presence of a relatively small percentage of an agent soluble in the acid which prevents the development of the above type of viscous mixture of acid, sludge, and oil in the formation. In the presence of such agent the acid not only enters the formation more readily and at lower pressures, but also acts upon the acid-soluble portions thereof at an increased rate, thus materially facilitating and increasing the effectiveness of the treatment. The invention, then, consists of the method hereinafter fully described and particularly pointed out in the claims.

In carrying out a treatment, it is generally preferable first to remove as much as possible of the oil and water, if any, standing in the bore, and then to fill the well with clean oil before introducing the acid solution. In the case of a flowing well, it may be shut in and allowed to fill with oil from the formation. By the foregoing steps hydrostatic control of the well may be secured, enabling the acid subsequently introduced to be directed into the formation at a desired level, as disclosed in U. S. Patents Nos. 1,891,667 and 2,018,199. Such steps, being conventional, form no part of my invention.

I employ aqueous hydrochloric acid solution having a suitable concentration, such as from 3 to 25 per cent of HCl by weight. A generally suitable concentration is about 15 per cent, although other strengths may be used, if desired. The amount used may vary over a wide range according to the conditions encountered, such as the thickness of the productive stratum to be treated and the area it is desired to affect. Ordinarily from about 200 to 2000 gallons or more may be used. An inhibitor is preferably added to the acid, as in usual practice.

According to my invention an agent capable of preventing the acid from forming a viscous mixture with the oil in the formation is introduced into the well, either in solution in the acid or as a separate operation ahead of the acid, in which case the acid and the agent become mixed as the acid enters the formation. The amount of the agent to be employed with the acid may be determined by test, as by mixing known amounts of agent and acid and then attempting to form a mixture of the so-treated acid and oil derived from the formation to be treated. Sufficient agent is added to the acid in such a test to permit mixing the oil and the acid without producing a mixture which is more viscous than either the oil or the acid solution alone. An agent which has been found to be effective to prevent the formation of viscous mixtures of oil and acid according to my invention is guaiacol. This substance is effective to prevent the formation of viscous mixtures when added to the acid which is introduced into the well or ahead of the acid as an aqueous solution in amount from about 0.1 to 2 per cent of the weight of the acid solution employed. A generally suitable amount is from about 0.5 to 1 per cent of the weight of the acid.

Although in carrying out a treatment the agent may be introduced into the well ahead of the acid and forced therewith into the formation by applying pressure, if necessary, it is generally more convenient to form a solution of the agent and the acid and then to introduce the so-formed solution into the formation as a single operation by similar procedure to that employed in acidizing wells generally. By the use of an acid solution containing the agent here described the action on the rock formation is immediate and complete, resulting in opening up the formation to an increased flow of oil in cases where a treatment with a simple acid solution without the agent gives highly unsatisfactory or even negative results. Another advantage is that, by greatly increasing the rate of attack by the acid upon the calcareous formation, the pressures required to force the acid into the formation are substantially reduced. In the practical application of my method in the field it has repeatedly been found possible to secure a rapid and successful acid treatment of wells, resulting in a large increase in flow of oil, in localities where the use of the conventional acid solution alone failed entirely to yield any increase and where, in fact, it was found in many cases almost impossible to force the acid into the rock by the use of any reasonable pressures.

Other modes of applying the principle of my invention may be employed instead of those explained, change being made as regards the method herein disclosed, provided the step stated by any of the following claims or the equivalent of such stated step be employed.

I therefore particularly point out and distinctly claim as my invention:

1. In a method of treating an oil well in a calcareous formation with aqueous hydrochloric acid, wherein the acid upon admixture with oil in the formation forms a viscous mixture hindering the penetration of the acid into the formation, the step which consists in introducing the acid into the well and thence into the formation in the presence of a relatively small proportion of guaiacol.

2. In a method of treating an oil well in a calcareous formation with hydrochloric acid wherein the acid upon admixture with oil in the formation forms a viscous mixture hindering the penetration of the acid into the formation, the step which consists in introducing into the well and thence into the formation hydrochloric acid solution to which has been added from about 0.1 to about 2 per cent of guaiacol.

CARROLL IRONS.